(12) United States Patent
Hädrich

(10) Patent No.: US 7,489,715 B2
(45) Date of Patent: Feb. 10, 2009

(54) OPTIMIZATION OF MODE SELECTION IN A LASER RESONATOR

(75) Inventor: Sven Hädrich, Düsseldorf (DE)

(73) Assignee: Sirah Laser-und Plasmatechnick GmbH (DE)

( * ) Notice: Subject to any disclaimer, the term of this patent is extended or adjusted under 35 U.S.C. 154(b) by 289 days.

(21) Appl. No.: 11/453,197

(22) Filed: Jun. 13, 2006

(65) Prior Publication Data

US 2006/0280508 A1    Dec. 14, 2006

(30) Foreign Application Priority Data

Jun. 13, 2005    (DE) .................. 10 2005 027 315

(51) Int. Cl.
*H01S 3/10* (2006.01)
(52) U.S. Cl. ............... 372/26; 372/29.016; 372/29.023
(58) Field of Classification Search ............... 372/26, 372/16, 29.016
See application file for complete search history.

(56) References Cited

U.S. PATENT DOCUMENTS

| | | | |
|---|---|---|---|
| 3,543,181 A | 11/1970 | Lee et al. | |
| 5,856,991 A | 1/1999 | Ershov | |
| 7,054,002 B1* | 5/2006 | Sevick-Muraca et al. | 356/317 |
| 2004/0004980 A1* | 1/2004 | Mazed | 372/32 |
| 2004/0196874 A1 | 10/2004 | Spiegelberg et al. | |

FOREIGN PATENT DOCUMENTS

| | | |
|---|---|---|
| EP | 0534305 | 3/1993 |
| JP | 03244176 | 10/1991 |

* cited by examiner

*Primary Examiner*—Dung T Nguyen
(74) *Attorney, Agent, or Firm*—Walter G. Hanchuk; Chadbourne & Parke LLP

(57) ABSTRACT

The so-called single-longitudinal mode of operation of a tunable laser beam source requires active control of the band-pass filters mounted in the laser resonator. As a rule, this entails one, or a combination of several filter elements, as for example birefringent filters, as well as etalons. In either case, the band-pass filter needs to be so adjusted as to locate precisely one of the feasible longitudinal modes of the laser at the exact maximum transmission of the band-pass filter. The invention consists in regulating such filter setting by way of a program-controlled digital signal processor DSP in such a way that the DSP modulates the filter element with an adjustable frequency, and such regulation exploits the phase of the laser intensity fluctuations induced thereby to regulate the optimal position of the band-pass filter.

19 Claims, 3 Drawing Sheets

OPTIMIZATION OF MODE SELECTION IN A LASER RESONATOR

RELATED APPLICATIONS

The present invention claims all rights of priority to German Patent Application No. 10 2005 027 315.7, filed on Jun. 13, 2005, which is hereby incorporated by reference.

FIELD OF THE INVENTION

The invention relates to a process and a control system for the optimization of mode selection in a laser resonator featuring at least one optical band-pass filter.

BACKGROUND OF THE INVENTION

Numerous scientific and technical applications require laser beams of adjustable, yet precisely defined wavelength. This necessitates the laser device to emit the radiation of a single, precisely defined mode of the laser resonator.

By means of appropriate geometry of the optical resonator, it is possible to ensure that only one transverse mode of the system oscillates. Beyond that, however, it is also necessary to restrict it to one longitudinal mode in order to afford the desired limited spectral bandwidth of the laser beam. The so-called single longitudinal mode (SLM) operation must be ensured by means of frequency-selective optical structural elements, the optical band-pass filters. The high spectral resolution of a band-pass filter requires an active regulation of the filter parameters in order to ensure that only one longitudinal mode oscillates in the laser resonator. A detailed illustration of the design of such band-pass filters can be found in Koechner's 1992 volume on *Solid State Laser Engineering*

In the past, the adjustment of band-pass filters was accomplished by the use of a so-called "hill-climbing" servomechanism, utilizing an analog modulation of the mid-setting, followed by analog demodulation of the intensity signal. Modulation took place at a fixed frequency (for example six kilohertz). The U.S. Pat. No. 3,543,181 by Lee at al. (1968) describes the construction of a simple embodiment of such a control.

With discrete analog circuits and/or processes of the aforesaid type it was heretofore technically difficult and/or economically unwarranted to normalize the control input signals. Hence, use was made either of simplified calculations, for example subtraction in lieu of division (that is to say, the first element of Taylor's series expansion), or by varying the gain of the next following control elements as a function of the laser power. Inasmuch as this involved, in part, a rough simplification of the required mathematical operations, the results were correspondingly unsatisfactory. With a variation of the laser output, the adjustments became unstable and the single longitudinal mode of operation was not ensured, leading to a so-called mode-hopping.

The analog modulation oscillators in use are limited to a fixed frequency. Since the modulation frequency is modulated upon the laser beam, it is necessary for the user to take this into account in using the laser, being correspondingly limited for example in the lock-in frequency of his own structures.

Most band-pass filters consist of several stages, all of which must as a rule be adjusted, which always involves the risk that the individual control circuits may interfere with each other. An analog control affords no chance to recognize this and afford suitable remedial measures. Optionally, individual components are not adjusted, which again unnecessarily limits the spectral tuning range of the laser system.

Customarily, the adjustment parameters of analog control circuits are established with the aid of discrete structural elements, such as for example trimming potentiometers. Such elements can only be adjusted manually and in sequence, a time-consuming procedure not reproducible beyond certain limits.

The "interim results" of an analog computation are not directly available, but must be laboriously prepared for the user with the aid of additional metering devices, such as for example the oscilloscope.

The operating amplifiers utilized in analog circuits require compensation of the so-called offset voltage, whereby the multi-stage control circuits utilized at this time involve the addition of offset voltages, that is to say, the adjustment is subject to distinct temperature and time-dependent drifts.

SUMMARY OF THE INVENTION

The object of the invention is to adjust the spectral setting of an optical band-pass filter system in such a way that a laser resonator emits at one single longitudinal resonator mode.

According to the present invention, this is achieved by the use of a program-controlled signal processor within a control system and/or a process for mode selection, that is, for the control of the band-pass filters. For example, it is possible to employ a digital signal processor (DSP).

According to the invention, the control system for the implementation of the process features at least one program-controlled processor which modulates at least one of the band-pass filters about its mid-position and records the resulting intensity fluctuations of the laser beam, especially at a scanning rate above 1 kHz, determines the phase shift between the intensity fluctuations and the modulation of at least one band-pass filter, and based on the detected phase shift, adjusts the mid-setting of at least one band-pass filter.

The advantage of the invention as compared to controls made up of discrete structural components is highlighted hereunder.

Greater stability of control signals. Inasmuch as, contrary to analog circuits, no use is made of operating amplifiers sensitive to DC voltages, the control circuit is less subject to temperature and time drifts.

The fact that the modulation frequency of the control and the evaluation of the signal take place at exactly the same time base, avoids any interference due to time-shifts of the modulation frequency.

Thanks to the program-controlled synthesis of the modulation frequency, the same allows of variable settings over an extended range.

In evaluating the signals, the error signals may be normalized at the absolute level of the signals.

The control recognizes critical system states and is able to intervene automatically and/or alert the user of the laser.

The input signals and the interim readings of the control circuits are immediately available to the user in digital form.

The control parameters may be varied by way of the program control, lending optimal support to different laser operating modes, with for example one set of parameters for stable setting on one fixed wavelength and one set of parameters for quick tune-up of the laser system.

The following figures provide a description of the invention in general and in the light of one concrete exemplified embodiment.

DETAILED DESCRIPTION OF THE DRAWINGS

Figure 1:
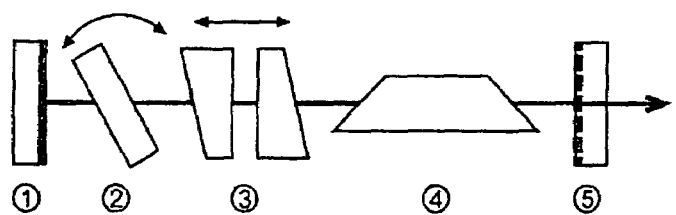
FIG. 1 shows an exemplary overview of a laser in accordance with an embodiment of the present invention.

According to FIG. 1, a laser comprises an optic resonator built up of two or more mirrors 1, 5 and an active laser medium 4, whereby one of the mirrors acts as a semi-transparent mirror 5, and by the same token as an out-coupler. Where the need is for especially monochromatic light, the intrinsic emission of the laser medium must be restricted by one or more band-pass filters 2, 3. For this purpose, use may be made of birefringent filters, etalon, etc.

Figure 2:
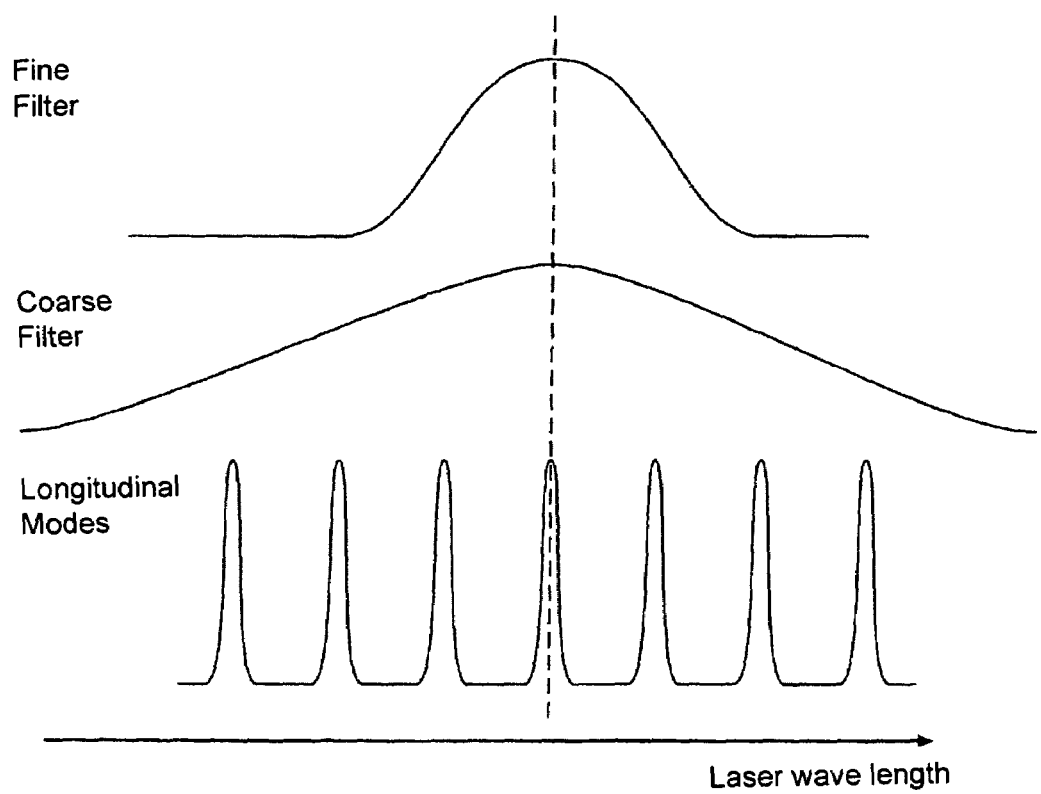
FIG. 2 shows exemplary laser emissions.

FIG. 2 shows a typical laser emission spectrum. In a resonator without band-pass filters, a number of longitudinal modes oscillate, limited only by the gain profile of the active laser medium. The spectral spacing of the longitudinal modes is fixed and predetermined by the resonance condition that the resonator length must correspond to an integer multiple of half the laser wavelength.

In the laser operation, however, this resonator length is not fixed. Rather, it changes due, for example, to thermal drifts, variations of the refractive index or deliberate changes of the resonator length for fine tuning of wavelength.

Spectral band-pass filters are often etalon-designed. Accordingly, they posess spectral periodicity and there is a need for a combination of filters of different resolution in order to deliberately select a definite laser wavelength. In broadband active laser media, the rough filter stages are often designed for prisms, grids or bi-refringent filters.

Inasmuch as the spectral position of the longitudinal mode must coincide with the spectral position of maximum transmission of the band-pass filter combination for the sake of efficient laser operation, active adjustment of the band-pass filter is required. Without such adjustment, one or more of the longitudinal modes will oscillate at random.

In principle, the adjustment according to the invention takes place as follows:

The original configuration of the resonator may be random, that is to say, the position of a high resolution band-pass filter may be chosen at will in relation to the longitudinal modes of the resonator. The spectral mid-setting of the band-pass filter both in this initial setting as well as in the subsequent continuous adjustment is modulated about a random zero point. This may be accomplished for example by activating a suitable actor, for example a piezoelectric drive to rotate an etalon or alter the distance between the flat etalon surfaces by means of a suitably modulated signal.

The preferred optimal variation features a sinus-shaped path, whereby the practicable forms of modulation are those lacking any fraction of the frequency below the frequency of modulation.

The wavelength variation of the mid-setting produced in this manner, that is to say the transmission maximum of the band-pass filter, triggers an intensity variation within the laser, for example in the output signal, because the setting of the transmission maximum of the band-pass filter shifts as against the fixed position of the longitudinal mode, thereby altering the efficiency of the laser.

The adjustment system according to the invention measures this variation, for example with the aid of a photodetector, e.g. in a suitable reflex. From the convolution of the (preset) modulation signal and the measured intensity variation the processor calculates the phase length of the intensity signal relevant to such modulation. In the optimal filter setting relative to the longitudinal mode, a theoretically effective 180-degree phase shift takes place, but the same may deviate therefrom due to further systematic phase shifts, so that the object of the adjustment may match a target value deviating therefrom.

From the deviation of the phase shift from this predetermined target value, the processor calculates the error signal. In turn, from the error signal the processor calculates, for example, with a PID control algorithm, the adjustment signal for the mid-setting of the band-pass filter, in order to achieve efficient and stable laser operation on a single resonator mode, notably the mode desired from the setting of the resonator length.

Thus, for example, by means of a suitable control the laser may be actively reset in its wavelength by varying the resonator length, whereupon the control optimally readjusts the band-pass filter. To this end, the control system may feature a ramp generator in order to vary the resonator length by way of a ramp signal via an actor, whereby in particular depending on the ramp signal it is possible to regulate in particular a broadband band-pass filter, as for example a birefringent filter. This dependence may for example be arranged as a function of the ramp signal.

The control system according to the invention is characterized in a further preferred embodiment in that an analog signal representative of the intensity fluctuations is digitalized and normalized, especially after an amplification and high-pass filtering, so as to secure a normalized phase shift by correlation with a modulation signal.

To this end, it is possible to adjust the normalized phase shift with the aid of a control, in particular a PID control as previously mentioned, onto a predetermined value as a control target, for which purpose in particular the control signal of the regulator is added to the modulation signal, in order to obtain a signal which, in particular after an analog conversion, modulates and drives in particular a piezoelectric actor of at least one band-pass filter.

The aforesaid mode of control applies in particular to the very narrow-band-designed band-pass filter, as for example thick etalons.

A further characteristic of the invention lies in the fact that out of the gained information as to the spectral setting of the resonator mode it is also possible to suitably adjust the spectral setting of the rougher filter stages.

Thus there is the possibility in a further embodiment for the adjustment of at least one additional, for example, broadband band-pass filter to take up an intensity signal reflected by the band-pass filter and to determine by division the ratio of this intensity signal to the signal of the intensity fluctuations, secured by modulation, notably after amplification and low-pass filtering of such signals, whereby the detected ratio is adjusted with a control, in particular a PID control, to a desired target value, by activating an actor for the adjustment of this band-pass filter, for example by the rotation of the Etalon.

By this it can be accomplished that a reflex from such a band-pass filter, for example etalon, may be substantially minimized in its intensity, that is to say essentially reaching the maximum transmission of the filter. However, inasmuch as such reflected intensity is necessarily also modulated by modulation, the ratio to the modulated intensity of the laser is obtained as previously described, thereby performing a normalization.

It is especially preferred for the band-pass filter to be adjusted in such a way that the preset reflection matches a value in the region of a downward/upward slope alongside the reflection minimum. This affords the possibility of determining the direction of a deviation from this adjustment target, which would not be feasible based on the symmetrical variation of the transmission about the transmission maximum of the filter, if the same were operated at maximum transmission, and by the same token at minimum reflection. Hence, according to the invention, the filter described here can readily be operated outside its optimum.

The modulation-conditioned intensity fluctuations may be measured after coupling out of the laser, in the back of a reflection mirror or even in a laser beam coupled onto a different resonator.

Figure 3:
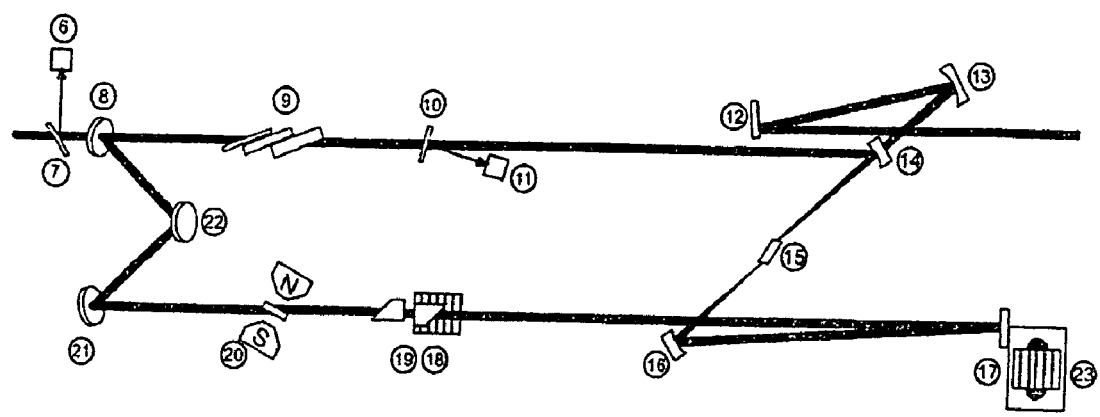
FIG. 3 shows an exemplary embodiment of the present invention employing a ring laser.
Figure 4:
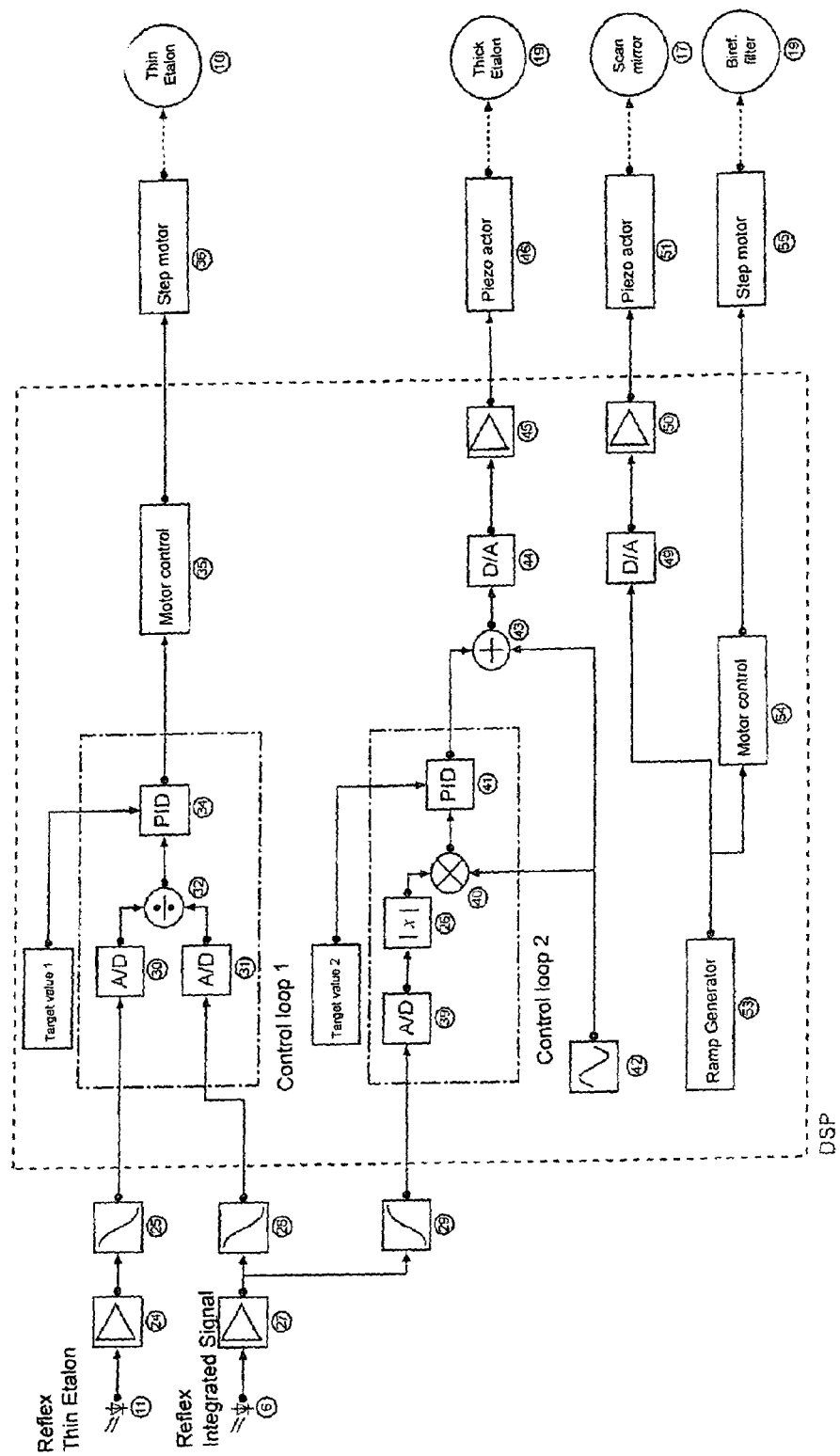
FIG. 4 shows an exemplary overview of a laser adjustment control in accordance with one embodiment of the present invention.

FIG. 3 shows a ring laser as a possible example of application, whereby a possible adjustment is illustrated in FIG. 4.

The present invention may be utilized in order to control an adjustable single-longitudinal mode titanium/sapphire laser. The laser to be adjusted features a ring resonator constructed of five mirrors 14, 16, 17, 21, and 22 and a disconnect coupler 8. The active laser medium in a Titanium-Sapphire crystal 15 optically pumped by a laser beam. The beam of the laser pump is coupled onto the crystal 15 via a plane mirror 12 and a focusing mirror 13. A magnetically biased TGG crystal 20 and a special arrangement of the height-misaligned resonator mirrors 21, 22, 8 constitute an optical diode. This constitutes a forced direction of travel of the optical radiation in the laser resonator, thereby avoiding spatial hole burning.

The length of the laser resonator can be deliberately varied by a mechanically activated piezoelectric actor 23, in order to permit fine-tuning the laser wavelength.

The roughest band-pass filter 9 is formed by a birefringent filter out of three quartz plates. The birefringent filter 9 restricts the laser emission to less than 40 GHz line width, thereby roughly determining the emission wavelength of the laser. The filter can be set with the aid of a stepping motor.

The thin etalon 10 reduces the line width of the laser radiation to approximately 10 GHz. By means of an adjustment driven by a stepping motor, it is possible to tilt, and thereby give spectral orientation to etalon 10 against the direction of the beam in the resonator. The thick etalon 19, with a beam input and output at a Brewster angle, features a distance adjustable with a piezoelectric actor 18 between its parallel surfaces, thereby permitting spectral adjustment as well. The mechanics of the thick etalon 19 and the piezoelectric actor 18 are designed in such a way as to permit adjustment of the etalon spacing with a modulation frequency of a few kHz.

For the amplifier 46 of the control system according to FIG. 4, the piezoelectric element constitutes a predominately capacitive load, acting as a low pass. This may bring about a phase displacement of the modulation signal at this site, which may be compensated by choosing an adjustable target value for the control loop 2 in lieu of a fixed target value.

Two signals are utilized for the adjustment/control. The reflex of the thin etalon 10 is picked up by a photodiode 11. Beyond that, a fraction of the laser emission after coupling out of the resonator is separated by a divider 7 and picked up by a photodiode 6, in order to record the intensity fluctuations arising out of the thick etalon 19 about its mid-setting.

The signals from the photodiodes are first of all amplified by the impedance converters 24, 27. For purposes of processing via the control loop 1, the signals are filtered through the low-pass filters 25, 28 at an edge frequency of approximately 50 Hz. Both signals are quantized through the analog/digital converters 30, 31. In order to secure adequate dynamics of the signal, the conversion should preferably take place with at least a 16 bit resolution. The ratio of the two signals is determined by division 32. A PID control 34 regulates the spectral setting of the thin etalon in such a way that the result of the division equals a "target value 1."

For purposes of elaboration via the control loop 2, the AC portion is separated through a high-pass filter 29 and quantized through an analog/digital converter 39. The path of the signal 26 is normalized, that is to say the lowest value of the signal path is always equal to minus one (−1) and the highest is equal to plus one (+1). Thereafter the correlation 40 is calculated from the signal path of modulation 42.

The result matches the normalized phase shift of the two signals (29 and 42). The phase shift is adjusted with a PID control 41 with the "target value 2" as the control target. The adjustment signal of the PID control 41 and the modulation signal 42 are added and converted into an analog signal path 44. The signal is amplified to the high voltage required for piezoelectric actors and fed to actor 46.

The signal shape most advantageous for the modulation signal 42 is a sinus signal, since none of the output is lost in the higher frequency portions and the signal to noise ratio is optimal. The modulation frequency must be high enough to follow the high-speed fluctuations of the laser resonator, the upward limit to the modulation frequency is given by the boundary frequency of the piezoelectric actors, the processing velocity of the analog/digital and digital/analog converter and the calculated output of the signal processes. Especially practicable are modulation frequencies between 1 and 8 kHz.

Integrated in the present laser system is in addition a ramp generator 53, which controls the piezoelectric actor 51 utilized for fine-tuning the wavelength. The ramp generator 53 generates a voltage path driving the piezoelectric actor 51 of the tuning mirror 17 through the digital/analog transducer 49 and amplifier 50. In the process, the birefringent filter 19 can be automatically centered on the emission wavelength, for example based on a preset dependence of its setting on the ramp signal.

Thus, with the control system according to the invention, it is possible to adjust and/or control all three wavelength selective components in order to achieve a narrow-band optimum depending on the desired wavelength.

To this end, the aforesaid process stages are executed preferably at least in part with the processor, in particular a digital signal processor.

The invention claimed is:

1. A control system for the optimization of mode selection in a laser resonator, comprising at least one optical band-pass filter, at least one program-controlled DSP processor which performs functions comprising:
   modulating at least one of the optical band-pass filters in relation to its spectral transmission maximum about a mid-setting and recording the intensity fluctuations of the laser radiation resulting therefrom,
   calculating a phase shift between the intensity fluctuations and the modulation of at least one optical band-pass filter, and
   regulating the mid-setting of at least one optical band-pass filter based on the detected phase shift.

2. The control system according to claim 1, wherein the control system digitalizes and normalizes an analog-captured signal representative of the intensity fluctuations, in order to secure a normalized phase shift by way of correlation with a modulation signal.

3. The control system according to claim 2, wherein the control system adjusts the normalized phase shift by means of a regulator, particularly a PID regulator, onto a preset value as a control target, wherefore in particular the control signal of regulator is added to the modulation signal in order to obtain a signal which after an analog conversion adjusts by modulation in particular a piezoelectric actor of at least one optical band-pass filter.

4. The control system according to claim 1 wherein for the adjustment of at least one additional optical band-pass filter it takes up an intensity signal reflected from the additional optical band-pass filter, and computes the ratio of such intensity signal to the signal of intensity fluctuations obtained by modulation, by division, whereby the ratio so computed is adjusted with a regulator, in particular a PID regulator onto the desired target value, by the activation of an actor for the resetting of such band-pass filter.

5. The control system according to claim 4, wherein the additional optical band-pass filter is regulated in such a way that the preset reflection matches a value within the range of a downward/upward slope alongside the reflection maximum, in particular to be able to detect the direction of a deviation from such control target.

6. The control system according to claim 1 wherein a signal generator, in order to vary the resonator length by means of a signal so produced by way of an actor, whereby in particular a an optical band-pass filter is regulated as a function of the signal.

7. The control system according to claim 1 wherein the modulation-induced intensity fluctuations are detected by a laser beam coupled onto another resonator.

8. The control system according to claim 1 wherein the parameter variations of the control loop are program-controlled by a data link, an input magnitude, interim result or control signal.

9. The control system according to claim 1 wherein the input signals may be displayed and/or read out via a data link.

10. The control system according to claim 1 wherein the interim results and/or the control signals may be displayed and/or read out via a data link.

11. The control system according to claim 1 wherein the control loops may be automatically deactivated, when one of the input magnitudes, interim results or control signals deviate from a preset boundary region.

12. The control system according to claim 1 wherein the modulation frequency may be varied by way of a data link and/or based on an input magnitude, interim result or control signal.

13. The control system of claim 1 further comprising a laser.

14. A method for the optimization of the mode selection in a laser resonator comprising at least one optical band-pass filter, comprising at least one program-controlled DSP processor with which at least one of the optical band-pass filters is modulated in relation to its spectral transmission maximum about its mid-setting, and the intensity fluctuations of the laser radiation resulting therefrom are detected, so as to compute a phase shift between the intensity fluctuations and the modulation of the at least one optical band-pass filter and adjust the mid-setting of the at least one optical band-pass filter based on the detected phase shift.

15. The control system of claim 1 wherein the laser radiation has a scanning rate in excess of 1 kHz.

16. The control system of claim 6 wherein the signal generator is a ramp generator.

17. The control system of claim 8 wherein the data link is one of the following: a USB interface, a serial interface, or a TCP/IP connection.

18. The control system of claim 2, wherein the analog-captured signal is normalized in the wake of an amplification and high-pass filtration.

19. The control system of claim 4 wherein the signal of intensity fluctuations is obtained after amplification and low-pass filtration.

* * * * *

UNITED STATES PATENT AND TRADEMARK OFFICE
CERTIFICATE OF CORRECTION

PATENT NO. : 7,489,715 B2  
APPLICATION NO. : 11/453197  
DATED : February 10, 2009  
INVENTOR(S) : Sven Hadrich It is certified that error appears in the above-identified patent and that said Letters Patent is hereby corrected as shown below:

On the title page:

item (73) Assignee, delete "Sirah Laser-und Plasmatechnick GmbH" and insert -- Sirah Laser-und Plasmatechnik GmbH --.

Signed and Sealed this

Fourteenth Day of July, 2009

JOHN DOLL  
*Acting Director of the United States Patent and Trademark Office*